May 5, 1936.  J. C. CAMPBELL  2,039,294
AUTOMATIC MANUAL CONTROL SUBORDINATOR FOR TRACER CONTROLLED MACHINES
Filed July 10, 1935  4 Sheets-Sheet 1
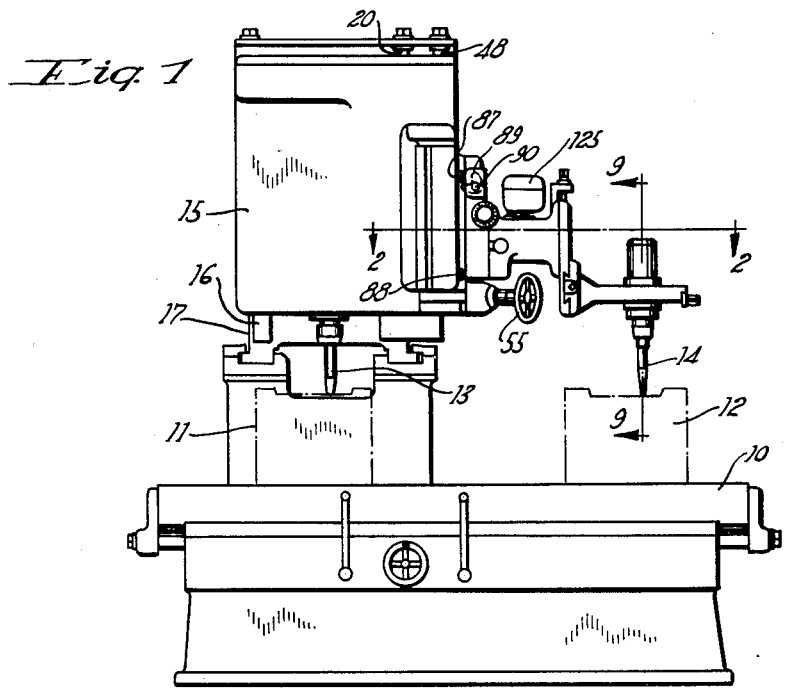
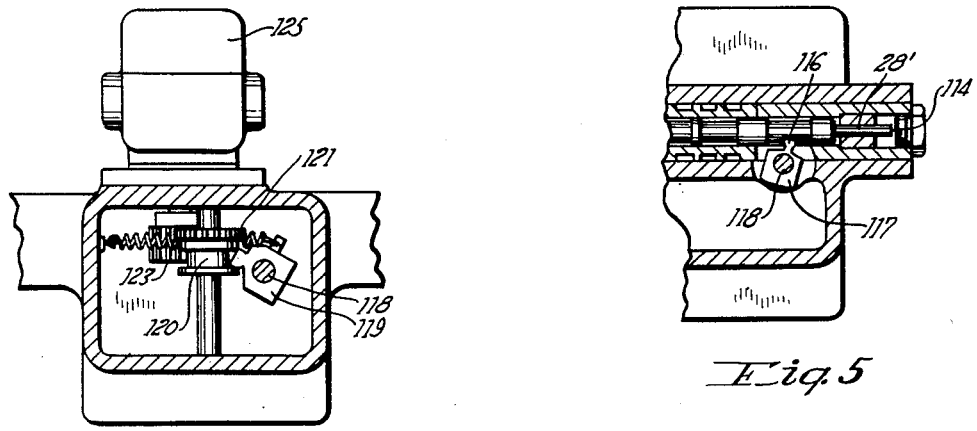
INVENTOR.
JOHN C. CAMPBELL
BY
ATTORNEY.

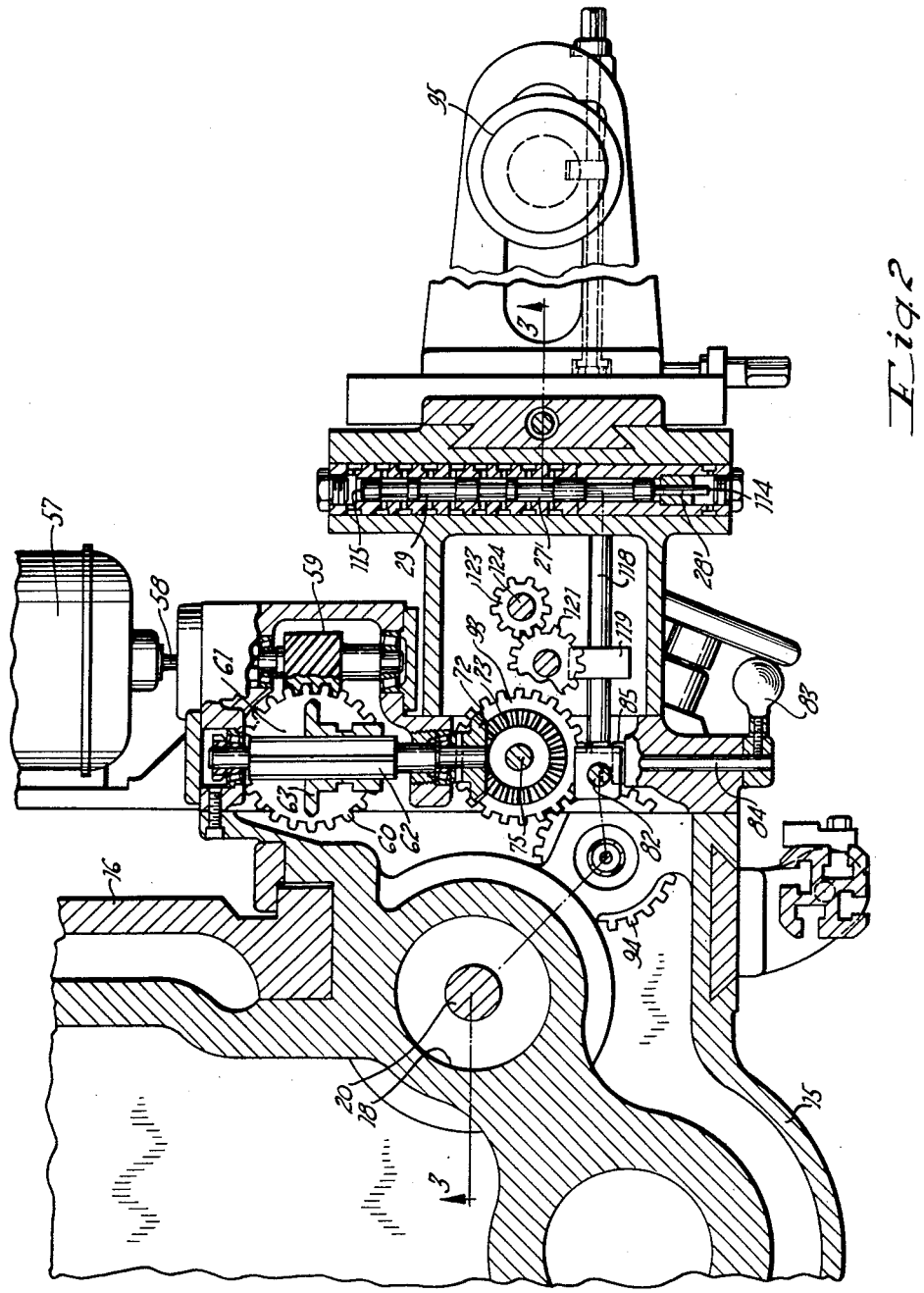

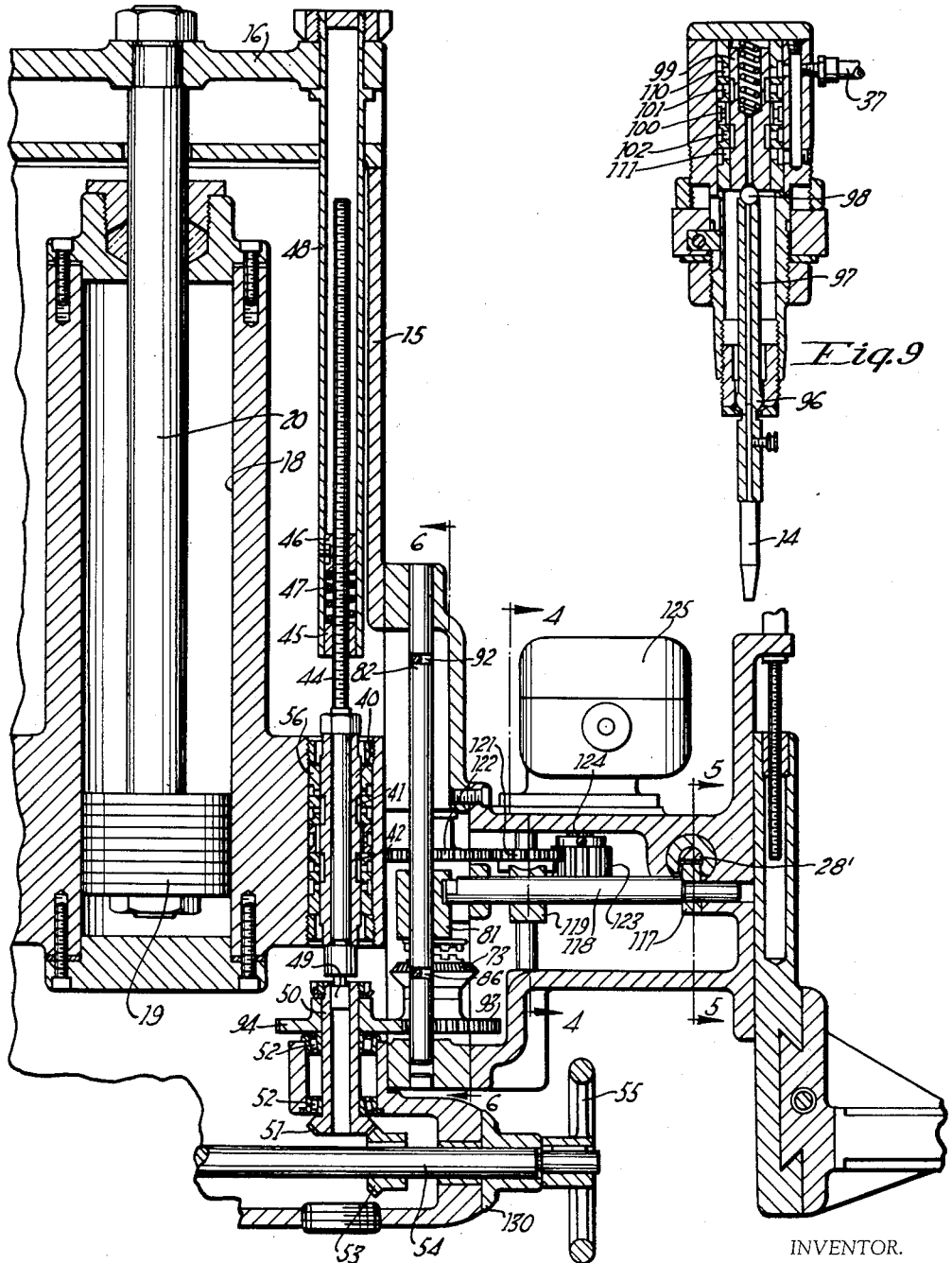

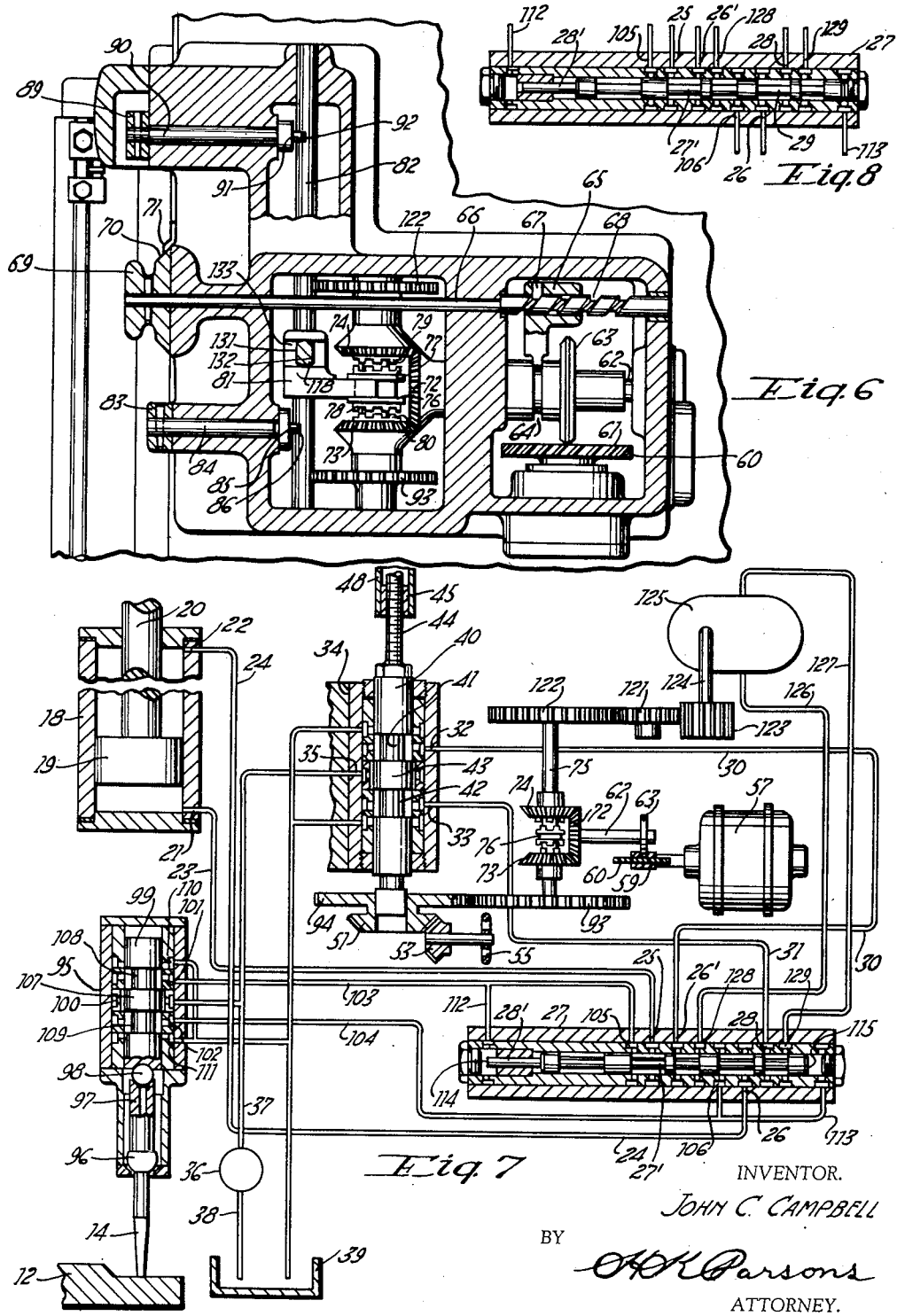

Patented May 5, 1936

2,039,294

UNITED STATES PATENT OFFICE 2,039,294

AUTOMATIC MANUAL CONTROL SUBORDINATOR FOR TRACER CONTROLLED MACHINES

John C. Campbell, Cincinnati, Ohio, assignor to The Cincinnati Milling Machine Co., Cincinnati, Ohio, a corporation of Ohio Application July 10, 1935, Serial No. 30,744

13 Claims. (Cl. 90—13.5)

Automatic pattern controlled machine tools have a yieldable tracer which is adapted to engage with light pressure a pattern, and to be held by the pattern in a predetermined position, together with means responsive to movement of the tracer away from said neutral position to effect a change in the direction of relative movement between the cutter and work automatically. Although such tracers are yieldable, they are actually capable of a very limited movement, which is usually measured in thousandths of an inch.

For purposes of set-up, adjustment, etc., such machines are also provided with manual controls which are effective to cause movement of the tracer support in a direction to effect contact of the tracer with the pattern. The operation of effecting engagement of the tracer with a pattern must be carefully done because the yieldability of the tracer is so small that any appreciable overrun will cause damage to the parts.

One of the objects of this invention, is to eliminate the possibility of damage to the tracer by careless use of the manual controls which determine the tracer position.

Another object of this invention is to provide means whereby the tracer will automatically assume control whenever the same is moved from its free position.

A further object of this invention is to provide means for automatically subordinating the manual control with respect to tracer control whereby the manual control is rendered ineffective upon engagement of the tracer with any object.

An additional object of this invention is to improve the operating characteristics of profiling machines.

Other objects and advantages of the present invent should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is a section on the line 2—2 of Figure 1.

Figure 3 is a vertical section on the line 3—3 of Figure 2.

Figure 4 is a detail section on the line 4—4 of Figure 3.

Figure 5 is a detail section on the line 5—5 of Figure 3.

Figure 6 is a detail section on the line 6—6 of Figure 3.

Figure 7 is a diagram of the hydraulic control circuit showing the manner of interlocking the various parts.

Figure 8 is a detail view showing the other position of the selector valve shown in Figure 7.

Figure 9 is a section on the line 9—9 of Figure 1.

In Figure 1 of the drawings is shown an illustrative embodiment of a machine embodying the principles of this invention in which the reference numeral 10 indicates a support upon which may be mounted a work piece 11 and a pattern 12. The reference numeral 13 indicates a cutter adapted to operate on the work piece and the reference numeral 14 indicates a tracer adapted to move over the pattern and reproduce the same automatically in the work piece. The tracer and cutter may be carried by a vertical slide 15, which is supported on guide ways 16, these guide ways being formed on a ram 17 which is movable in a horizontal plane toward and from the support 10. From the foregoing it will be apparent that if the table 10 is moved longitudinally and the carrier 15 moved up and down to cause the tracer 14 to scan the profile of the pattern 12 that the cutter 13 will exert a similar relative movement with respect to the work piece 11 and reproduce therein a surface similar to the profile surface of the pattern 12.

In such machines it is necessary for set-up and loading purposes to provide some form of manual control means for adjusting the cutter and tracer relative to the work and pattern support. Furthermore, for automatic control it is necessary that the tracer be coupled in a suitable manner to control the relative movement between the cutter and work in order that the path of relative movement between the cutter and work is the same as the relative path between the tracer and pattern. Since these two different controls operate upon the same member manually operable means have been provided in prior machines for transferring the control from one to the other. This invention contemplates means for automatically effecting this transfer and is so designed that the manual control is always subordinated to the tracer control so that whenever the tracer is deflected from its free position, or is in engagement with a pattern that the tracer will automatically assume control and at the same time render the manual control ineffective.

One form of manually operable means which may be utilized for effecting relative movement between the tracer and cutter supporting slide and the work and pattern supporting slide will now be described, reference being had more particularly to Figure 3. A cylinder 18 is formed integral with the slide 15 and has a contained piston 19 which is connected by piston rod 20 to the ram 16. In this case, the cylinder is the part that is moved, the piston and piston rod remaining stationary.

Referring to Figure 7, the cylinder 18 has a pair of ports 21 and 22 which are connected by channels 23 and 24 respectively to ports 25 and 26 of the selector valve 27. This valve has a plunger 28' which, when in the position shown in Figure 8, couples port 25 to port 26' by means of cannelure 27'; and port 26 to port 28 by means of cannelure 29. The ports 26' and 28 are connected by channels 30 and 31 to ports 32 and 33 respectively of a servo control valve 34. This valve has a pressure port 35 which is supplied from a pump 36 through channel 37, the pump having an intake 38 through which fluid is withdrawn from a reservoir 39.

The servo-valve has a plunger 40 in which is formed a pair of annular grooves 41 and 42 and an intermediate spool 43. The spool 43 is of sufficient width that when in a substantially central position with respect to port 35 no fluid will flow to ports 32 and 33 and the pressure in opposite ends of the cylinder 18 will be equal. Since the piston 19 is a differential piston, the spool 43 will not be exactly in a center position with respect to port 35 because it will be necessary to maintain a higher unit pressure on one end of the piston than on the other.

The plunger 40 has a long lead screw 44 integral therewith which passes through a first nut member 45 and a second nut member 46, the latter being held yieldably separated from the first by a spring 47 in order to eliminate lost motion. These nut members are carried by a tube 48 which is integral with the ram 16 which thereby holds the nuts in a fixed position. The lower end of the plunger has a squared portion 49 which fits into a squared hole formed in the end of the hub 50 of bevel gear 51 which is anti-frictionally mounted on bearings 52. These bearings hold the bevel gear for movement with the slide 15. The bevel gear 51 is operatively connected through a bevel gear 53 with the manually rotatable shaft 54 having the hand wheel 55 secured to the exterior end thereof.

Rotation of the hand wheel 55 will cause rotation through the connections just described of the plunger 40, and thereby relative rotation between the lead screw 44 and the nut members 45 and 46, whereby the plunger 40 will not only be rotated but will be moved axially a small amount. The squared portion 49 on the end of the plunger has a sliding fit with the interior bore of the bevel gear 51 whereby this movement may take place without breaking the driving connection from the bevel gear.

Dependent upon the direction of rotation of the hand wheel 55 the spool 43 will be displaced relative to the port 35 in one direction or the other, thereby admitting pressure fluid from port 35 to either of channels 30 or 31 and thereby to either of channels 23 or 24 which in turn will cause upward or downward movement of the slide 15. Since the exterior sleeve 56 of the servo valve 34 is integral with the cylinder 18, the same will be moved when the cylinder moves and in a direction to reposition the sleeve, which carries the pressure port 35, with respect to the spool 43, a sufficient amount that it will re-equalize the resultant opposing pressures on piston 19 and thereby stop the movement of slide 15.

In other words, a servo valve mechanism is provided which is manually operable by the hand wheel 55 to control the flow to cylinder 18 and thereby the position of the slide 15.

In addition to providing manually operable means for actuating the servo valve, power operable means may also be provided which may take the form of a prime mover 57 having a drive shaft 58 to which is integrally connected a worm 59. As shown in Figure 2, the worm 59 rotates a worm gear 60 which has integral therewith a friction plate 61. A spline shaft 62 is arranged above the plate with its axis lying in a plane which passes through the center of rotation of the plate. This shaft carries a friction disc member 63, the periphery of which frictionally engages the face of plate 61 whereby upon movement of the disc 63 eccentrically with respect to the axis of rotation of the disc 61 the shaft 62 will be rotated at variable speeds. As more particularly shown in Figure 6, the disc 63 has an annular groove 64 which is engaged by a shifter fork 65 which is supported on shaft 66 and has a pin 67 which travels in a spiral groove 68 whereby upon rotation of shaft 66 the disc 63 may be adjusted with respect to the axis of rotation of disc 61. The shaft 66 extends to the forward part of the machine where it is provided with a manually operable handle 69 having integrally associated therewith a graduated dial 70 which is movable with respect to a fixed pointer 71. The dial is graduated to indicate the feed rate yielded by the various positions of the disc 63.

The shaft 62 has a bevel gear 72 fixed to the end thereof in constant mesh with a pair of opposed bevel gears 73 and 74 mounted for free rotation on a shaft 75. A shiftable clutch 76 having clutch teeth 77 and 78 on opposite ends thereof is utilized to interconnect either bevel gear 74 or bevel gear 73 to shaft 75 for effecting rotation in opposite directions. The clutch teeth 77 are adapted to be interengaged with clutch teeth 79 formed on the face of gear 74 and the clutch teeth 78 are adapted to be interengaged with clutch teeth 80 formed on the face of bevel gear 73. The shaft 75 is connected by spur gears 93 and 94 to the hub of bevel gear 51. The clutch 76 has a shifter fork 81 which is connected to the shifter rod 82 and this shifter rod may be operated by the manual control lever 83 fixed to the end of shaft 84 and having an eccentric pin 85 integral with one end thereof interengaging a groove 86 formed in the shifter rod.

The rod 82 may also be shifted by dogs 87 and 88 engaging the trip lever 89 secured to the end of shaft 90, this shaft also being connected by an eccentric pin 91 engaging a groove 92 in the shaft 82.

It is thus possible to manually engage the clutch 76 for power operation of the servo valve mechanism and to provide stop dogs for disengaging the clutch after a predetermined movement of the slide 15. There has thus been provided manual control means in the form of the hand wheel 55 and of the lever 83 for causing movement of the slide 15.

For automatic profiling or die-sinking purposes the selector valve plunger 28' is shiftable to the left from the position shown in Figure 8, or in other words, to the position shown in Figure 7, for coupling the cylinder 18 to the tracer head indicated generally by the reference numeral 95 for automatic control by the tracer 14. The tracer 14 has a spherical portion 96 integral therewith by which it is supported for universal movement in the tracer head 95 and a lever arm 97 extending upward beyond the portion 96 for supporting a ball 98 which supports the end of the tracer valve plunger 99. The end of the arm 97 is concaved so that upon lateral movement of the arm 97 the ball will ride up the side of the concavity and effect movement of the plunger 99. The tracer head has a pressure port 100 which is supplied with fluid from pump 36. It also has a pair of ports 101 and 102 which are connected by channels 103 and 104 to ports 105 and 106 respectively of the selector 27. When the selector valve plunger 28' is in the position shown in Figure 7, port 105 is connected to port 25 and thereby to the lower end of cylinder 18, and the port 106 is connected to port 26 and thereby to the upper end of cylinder 18. The tracer valve plunger 99 is in effect a servo valve in that it has a central spool 107, which normally closes the pressure port 100, and a pair of cannelures 108 and 109 on opposite sides thereof for connecting the pressure port to either port 101 or port 102, depending upon the direction of movement of the plunger. These cannelures also serve to connect ports 101 and 102 to the exhaust ports 110 and 111 respectively so that upon movement of plunger 99 away from its central position one of the ports will be connected to pressure and the other one connected to exhaust.

When the tracer 14 is in contact with the pattern 12, for instance, it moves the plunger 99 to the central position in which it is shown in Figure 7, whereby a rise or eminence on the pattern will move the plunger 99 still further upward and connect the pressure port 100 to port 102; and when the tracer arrives at a depression in a pattern the plunger 99 will move downward from the central position shown and connect the pressure port 100 to port 101. From this it will be seen that the tracer may directly control the flow of fluid to cylinder 18 and thereby control the upward and downward movement of cutter 13 in accordance with the shape of the pattern.

When the tracer 14 is out of contact with the pattern, that is, in a free position, it will be apparent that the plunger 99 will move downward and connect port 100 with port 101, which normally would cause the cylinder 18 to move downward, or in other words, in such a direction as to cause engagement of the tracer 14 with the pattern and the cutter with the work. The mechanism is so constructed, however, that this does not take place and the selector valve operates automatically to revert the control to the manual control means immediately upon the tracer moving out of contact with the pattern, and on the other hand, it operates in such a manner as to remove the control from the manually operable means and place it under the guidance of the tracer, the moment the tracer engages the pattern. The most important function of this is to prevent the operator from feeding the slide 15 downward beyond the point that the tracer engages the pattern because any further movement will cause permanent damage to the parts. It is designed to take care of the situation which often occurs, especially during set-up, of the operator moving the slide 15 to position the cutter 13 without watching the position of the tracer 14 relative to the pattern 12. Since the tracer is to be the predominating member, the tracer controlled channel 103 is connected by a branch 112 to the left end of valve housing 27, and channel 104 is connected by a branch 113 to the right hand end of the valve housing.

Furthermore, the left end of plunger 28' is reduced in diameter as shown at 114 so that this area is less than one-half of the area 115 of the right hand end of the plunger. The object of this is that when the tracer is free, pressure exists in line 103 and no pressure exists in line 104, whereby the plunger 28' is shifted to the right, or in other words, to the position shown in Figure 8. When the tracer 14 is deflected or moved axially, either by hand or by engagement with some object, a sufficient amount to cause the total pressure on the area 115 to be greater than the total pressure on the reduced area 114, the valve plunger 28' will be shifted to the left. Thus, the minute that the valve plunger 28' is shifted to the position shown in Figure 7, the manual controls 55 and 83 are rendered ineffective.

When the valve plunger 28' is shifted to the position shown in Figure 7, not only is the manual servo valve mechanism disconnected from cylinder 18 and the tracer controlled valve connected thereto, but means are also actuated to insure that the reverser clutch 76 is shifted to and held in a neutral position so that it will be impossible to power operate the servo valve 34 from the prime mover 57, and, in addition, means are connected to shaft 75 to prevent manual rotation of the manual control 55.

These results are obtained in the following manner. The valve plunger 28' is operatively connected by a ball and socket joint 116, as shown in Figure 5, to lever 117 fixed to the end of a rotatable shaft 118. Referring to Figure 4, the shaft 118 has another lever 119 fixed therewith which engages an annular groove 120 formed in the hub of a shiftable gear 121, which gear is adapted to operatively connect a spur gear 122 keyed to the end of shaft 75 with a pinion gear 123 fixed to the end of a motor shaft 124 which is adapted to be rotated by a hydraulic motor 125. A spring is connected to the shaft 118 and normally urges the same in a direction to disengage gear 121, and also to rotate the shaft 118 in a counterclockwise direction, which is effective as shown in Figure 5 to assist the movement of the plunger 28' in a direction to position the selector valve in the manual control position.

At the same time that the gear 121 is moved into operative mesh with gears 122 and 123, the channels 126 and 127 of motor 125, which terminate in ports 128 and 129 in the selector valve, are connected by the selector valve to channels 30 and 31 respectively of the servo valve 34. Thus, when the cylinder 18 and slide 15 are caused to move upward or downward by the tracer control valve, the valve sleeve 56 of the manual servo valve is moved relative to plunger 40 which thereby admits fluid to one port or the other of the hydraulic motor 125 and the resultant actuation causes rotation of plunger 40 through gears 123, 121, 122, shaft 75, gears 93 and 94, and this in turn causes rotation of the screw 44 relative to the nuts 45 and 46 whereby the plunger 40 is caused to follow up the movement of the valve sleeve 56. The bevel gears 51 and 53 will, of course, be rotated with the gear 94, whereby the hand wheel 55 will now be under the control of the hydraulic motor 125, and it will be impossible to manually operate it at a different rate.

In addition to this, the advantage of causing rotation of the hand wheel 55, when the slide 15 is moved by the tracer, is that the graduated dial 130 associated with the hand wheel 55 will always truly indicate the setting of the parts.

Referring to Figure 6, the end of shaft 118 has a pair of flat sides 131 and 132 and this end of the shaft projects into a slot 133 formed in the shifter fork 81, whereby the large diameter of the shaft will position the shifter fork in a central position to prevent shifting thereof when the tracer is in control, but when the plunger 28' is shifted to its manual control position, the shaft 118 will be rotated 90° from the position shown in Figure 6 and the flat sides will permit upward or downward movement of the shifter fork. Incidentally, when the shifter fork 81 is moved to a central position the manually operable lever 83 and the trip control lever 89 will also be moved to a central position due to their eccentric pin interconnections with shaft 82.

The tracer may be disengaged from the pattern to thus separate the cutter from the work by manually deflecting the tracer a maximum amount. While thus held, a maximum flow will pass through port 102 and subsequent connections, to port 22 of cylinder 18, causing upward movement of the carrier. As soon as the tracer is released, however, the selector valve 28' will automatically shift to the position shown in Figure 8, rendering the manual control means effective.

There has thus been provided a mechanism which subordinates the manual controls of a slide adapted to be tracer controlled, whereby the effectiveness or ineffectiveness of the manual controls are automatically determined in accordance with the position of the tracer.

I claim:

1. In a machine tool having a pair of relatively movable slides, one of which carries a tracer engageable with a pattern carried by the other slide, the combination of manually operable means for effecting said relative movement, and means responsive to deflection of the tracer for rendering said manual control means ineffective.

2. In a pattern controlled machine tool having a first support, and a second support movable toward and from the first support, the combination with a tracer carried by one of said supports, of manually operable means for effecting relative adjustment between said supports, and power operable means responsive to movement of the tracer for rendering said manually operable means ineffective.

3. In a pattern controlled machine tool having a work support and a tool support, the combination of a fluid operable motor for effecting relative adjustment between said supports, a first servo-valve mechanism, a second servo-valve mechanism, and a selector valve for alternately coupling said servo-valve mechanisms to said motor, and power operable means for shifting said selector valve.

4. In a pattern controlled machine tool having a work support and a tool support, the combination of a fluid operable motor for effecting relative adjustment between said supports, a manually operable servo-motor mechanism, a tracer controlled servo-motor mechanism, a selector valve for selectively coupling said servo-motor mechanisms for control of said motor, and fluid operable means for positioning said selector valve.

5. In a pattern controlled machine tool having a pair of relatively movable slides, the combination of a fluid operable motor coupled for actuation of one of said slides, a first servo-valve mechanism, power operable means for actuating said mechanism, a second servo-valve mechanism including a tracer adapted to engage a pattern, and power operable means for selectively connecting said mechanisms for control of said motor.

6. In a pattern controlled machine tool having a cutter support and a work support, the combination of a fluid operable motor for effecting a relative advancing and retracting of one support with respect to the other, a servo-valve mechanism for controlling actuation of said motor, manually operable means and power operable means for selective actuation of said mechanism, a tracer and a pattern carried by the respective supports, a tracer controlled valve also adapted for controlling actuation of said motor, and means for selectively connecting said servo-valve mechanism or said tracer valve for control of said motor.

7. In a pattern controlled machine tool having a tracer and a pattern support, the combination of manually operable means for effecting movement of the tracer toward the pattern support, and means responsive to engagement of the tracer with a pattern to render said manually operable means ineffective.

8. In a pattern controlled machine tool having a cutter support and a work support, the combination of a piston and cylinder for actuation of one of said supports, a tracer controlled valve having a pressure port and a pair of additional ports connected to said cylinder, a valve for disconnecting said ports from the cylinder, and fluid operable means connected to one of said additional ports whereby when the tracer moves to its free position to connect the other of said additional ports to exhaust said valve will be shifted to disconnect said additional ports from said motor.

9. In a pattern controlled machine tool having a pattern slide and a tracer slide, the combination of a fluid operable motor for effecting relative movement between the slides, a tracer carried by the tracer slide, a valve operatively connected with the tracer, said valve having a pressure port and a pair of additional ports, a selector valve, a pair of channels extending from said selector valve to the motor, a second pair of channels extending from the valve to said additional port, means in the tracer valve positionable when the tracer is in a free position to connect the pressure port to one of said additional ports and to connect the other additional port to exhaust, means connecting said additional ports to opposite ends of the selector valve for shifting the same, and means in the selector valve when in one position to connect said additional ports to the respective motor channels when in the other position to disconnect said motor channels from said additional ports.

10. In a machine tool of the class described, the combination of a work support and a tool support, power operable means for effecting a relative movement between the supports including a clutch movable from a neutral position to a power transmitting position for coupling said means for movement of one of said supports, a deflectable tracer carried by one of said supports, and means operatively connected and responsive to tracer deflection for automatically shifting said clutch to its neutral position.

11. In a machine tool of the class described, the combination of a work support and a tool support, power operable means for effecting a relative movement between the supports including a clutch movable from a neutral position to a power transmitting position for coupling said means for movement of one of said supports, a deflectable tracer carried by one of said supports, means operatively connected and responsive to tracer deflection for automatically shifting said clutch to its neutral position, and positive acting means for holding said clutch in its neutral position while said tracer remains deflected.

12. In a machine tool of the class described, the combination with a movable slide, of a piston and cylinder for effecting movement thereof, a support for said slide, a servo-valve having a pair of relatively movable parts for controlling the flow to said cylinder, one of which is connected to the slide and the other to said support, a source of pressure, means to couple the source of pressure to said cylinder through said servo-valve, or exclusive thereof, whereby one of said parts will be initially moved in the first case and the other of said parts will be initially moved in the second case, and means to cause follow-up movement of the remaining part in each case.

13. In a machine tool of the class described, the combination with a support and a slide movable thereon, of a piston and cylinder, one of which is connected to the slide and the other to the support for effecting relative movement therebetween, a servo-valve having a pair of relatively movable parts for controlling the flow to said cylinder, a source of pressure connected to the servo-valve, a rotatable member for initiating movement of one of said parts, an indicator associated with said member, means to couple said source of pressure to the cylinder exclusive of the valve whereby the other part of said valve is initially moved, and means connectible with the valve to cause a follow-up movement of the first part and simultaneous actuation of the indicator whereby the movement of the slide may be determined regardless of the manner of actuation thereof.

JOHN C. CAMPBELL.